United States Patent Office 3,330,721
Patented July 11, 1967

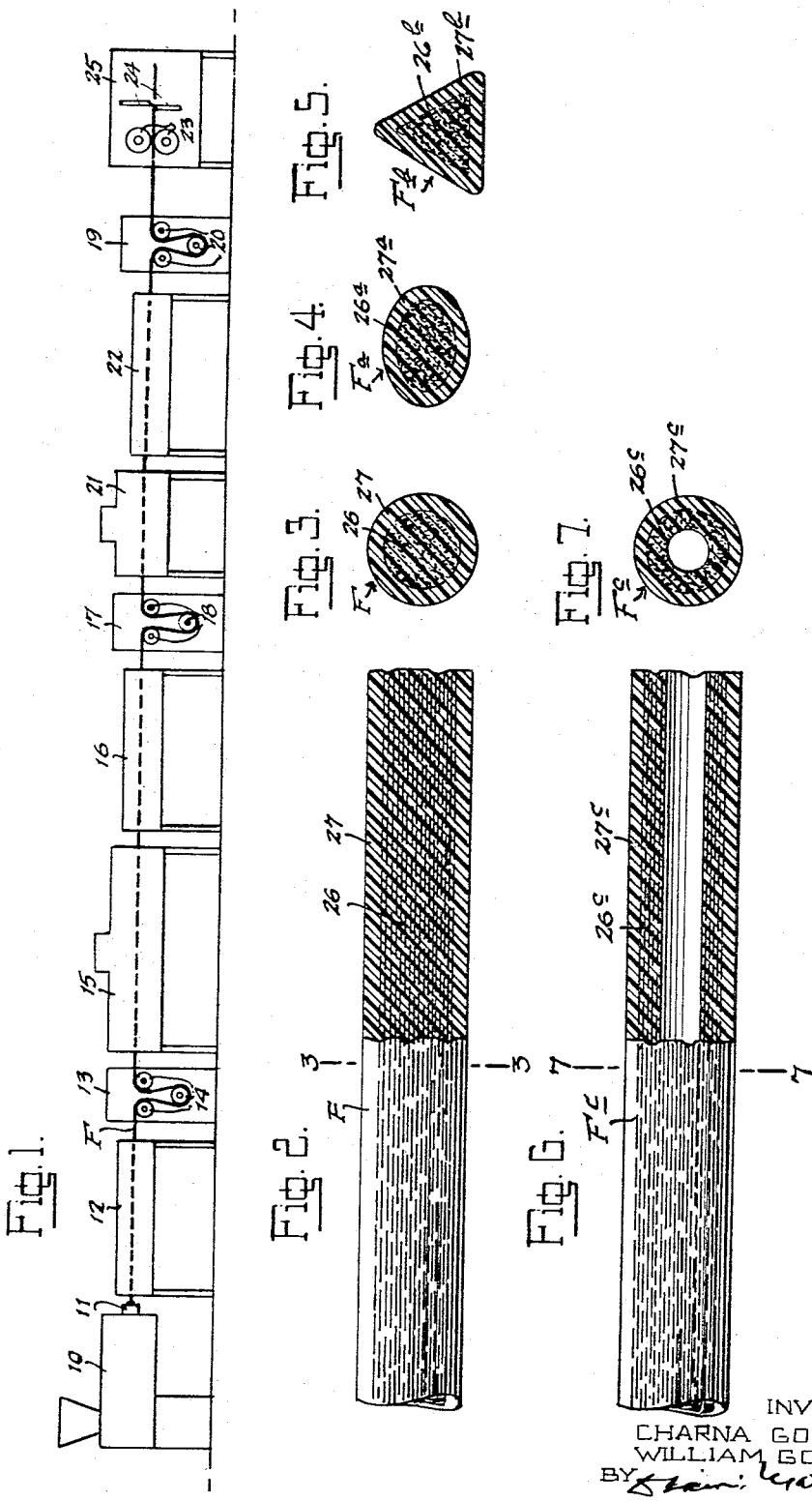

3,330,721
SYNTHETIC FILAMENTS AND METHOD OF
MAKING THE SAME
Charna Gould and William Gould, Millburn, N.J. (both of
280 Badger Ave., Newark, N.J. 07108)
Original application May 2, 1963, Ser. No. 277,630, now
Patent No. 3,217,074. Divided and this application June
29, 1965, Ser. No. 478,507
4 Claims. (Cl. 161—175)

The present invention relates to synthetic filaments and method of making the same, and the present application is a division of application Ser. No. 277,630, filed May 2, 1963, now Patent No. 3,217,074, which application is a continuation-in-part of our applications under the same title Ser. No. 131,137 filed Aug. 14, 1961 and Ser. No. 162,469 filed Dec. 27, 1961, both now abandoned.

According to one aspect of the invention it is an object to provide a solid synthetic filament preferably formed of polypropylene of suitable type and comprising a linearly oriented fibrous core having an integral outer surface casing in the form of a homogeneous remelt of the synthetic material, and which provides a filament having a high degree of snap-back and stiffness as well as maximum tensile strength and resistance to splitting, abrasion and fracture. Such filament also has low residual elongation and high resistance to creep. While such filament may find application in many uses it is especially advantageous for the production of brush bristle lengths, particularly heavy-duty brush bristles such as are used in large industrial brushes and street cleaning brushes, where the bristles are relatively large gauge.

According to another aspect of the invention it is an object to provide a tubular synethetic filament preferably formed of polypropylene of suitable type, which is linearly oriented to provide a fibrous tubular inner core or body and is provided with an integral homogeneous remelt casing which has the property of allowing the tubular filament to be bent upon itself without splitting or fracture, and which when straightened out will resume useful stiffness through the elastic memory of the material and the property of the homogeneous remelt casing of bending, stretching and compressing without splitting or fracture. Such tubular filament, while finding application in many uses, is particularly suited to use as the stem or handle of lollipops, medical applicators, and the like, which have heretofore employed stems or handles in the form of wood sticks, compressed paper sticks, and in some cases synthetic plastic sticks. These, however, have the disadvantages of being subject to easy breakage and splintering in the case of wood sticks, and permanent loss of the necessary stiffness in the case of paper and unoriented synthetic plastic sticks when subjected to sharp bending. Also, such materials in these uses are subject to deterioration from moisture absorption and heat and therefore are unhygienic and do not lend themselves to proper sterilization, particularly in the case of unoriented plastic medical applicators which will deform when subjected to live steam sterilization.

The practice heretofore in producing oriented synthetic filaments is to extrude the plasticized material into a quench tank from which it is drawn by a first godet provided with drafting rolls, and is then subjected to an orientation step by drawing it through a heating oven by means of a second godet at a differential speed ratio which orients the polymer molecules. This orientation transforms the homogeneous plastic into a fibrous filament which is very strong lengthwise and weak cross-section-wise and therefore is subject to lengthwise splitting especially when the filament is sharply bent. The amount of orientation possible is a function of temperature, and the best temperature for a strong filament is that which allows the maximum speed ratio. Maximum strength is obtained when the highest speed ratio is maintained without breaking the filament and the limitation or maximum speed ratio in relation to oven temperature has been one that will not weaken the surface structure of the filament. The practicable limitations have been a temperature of the order of 350° F. more or less, and a speed ratio of about 7–1.

It is proposed according to the invention to extrude the plasticized material through a suitable die or spinneret—including a mandrel in the case of tubing—and to orient the filament to the point of maximum strength stiffness, i.e., beyond the limit heretofore considered practicable and where surface structure is allowed to weaken in order to obtain maximum tensile strength of the bulk of the mass. It is further proposed to subject the oriented filament with its weakened cross-section to a further step wherein it is drawn by a third godet through a high heat melting oven which remelts the weakened surface structure to a substantial depth inwardly from the surface to produce a homogeneous fused wear-resistant non-oriented outside layer having a high degree of strength and elasticity both lengthwise and cross-section-wise, and which encases a linearly oriented fibrous core or body of maximum tensile strength. It is further proposed to subject the filament to certain cooling steps following the heating steps to set the oriented filament in straight line form following its passage through the godets, and in the case of a tubular filament preventing the pull of the godets from flattening or distorting the tubular shape.

Heretofore methods have been employed wherein an oriented filament is subjected to the heat of a second oven as a so-called relaxing step designed to relax internal stresses and shrink the filament by heat setting, but the relaxing temperatures employed are considerably below the surface melting temperatures contemplated in the present invention.

Other objects and advantages will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

FIG. 1 is a schematic side elevation of apparatus suitable for carrying out the method of the invention;

FIG. 2 is a view partially in side elevation and partially in longitudinal section, and on an enlarged scale, of a length of synthetic filament according to the invention;

FIG. 3 is a transverse sectional view taken along the line 3—3 of FIG. 2;

FIG. 4 is a transverse sectional view of a modified filament of oval cross-section according to the invention;

FIG. 5 is a transverse sectional view of a modified filament of triangular cross-section according to the invention;

FIG. 6 is a view in side elevation and partially in longitudinal section and on an enlarged scale of a length of synthetic filament according to the invention; and FIG. 7 is a transverse sectional view taken along the line 7—7 of FIG. 6.

Referring particularly to FIG. 1 of the drawing, the plastic material, preferably polypropylene but which may be other suitable fibre-forming, linear polymeric, thermoplastic material, is extruded from an extruder 10 through a filament forming unit 11 which may be a spinneret in the case of a solid filament or a combination spinneret and mandrel in the case of a tubular filament, these units being of well-known form. The extruded filament is carried through a quench or cooling tank 12 which contains a coolant, preferably water, maintained at a substantially constant temperature suitable for transforming the molten material emerging from the extruder and which solidifies as it encounters the air into a filament F, which at this stage of the process is homogeneous throughout. The temperature, pressure, and speed of the extruder depends upon the melting temperature and the flow rate of the particular material, as will be understood. A first godet 13 having three driven rollers 14 about which the filament is carried operates at a speed slightly higher than the lineal extrusion of the extruder to draw the filament through the quench tank and slightly stretch it between the extruder and the first godet.

It is next subjected to the orientation or drafting step by drawing through a heating oven 15 and thence through a cooling tank 16 by means of a second godet 17 having three driven rollers 18 about which the filament is carried, the temperature of the oven 15 and the speed ratio between the first godet 13 and the second godet 17 being related and predetermined by the particular requirements of the plastic material, the greater the speed ratio below the breaking point of the filament the greater the lineal orientation of the polymer molecules. By interposing the cooling tank 16 between the oven 15 and the second godet 17 the oriented filament is set in straight line form as soon as it emerges from the oven. In the case of a tubular filament the pressure of the pull of the second godet is prevented from flattening or distorting the tube. In practice, it has been found that depending upon the size, shape and type of extruded filament, whether solid or tubular, a satisfactory oven temperature for polypropylene extruded in sizes ranging from about .012″ to about .120″ may range from about 400° F. to about 1200° F at speed ratios ranging from about 1–4 to 1–11. In any case the orientation step according to the invention is such that the degree of orientation exceeds that heretofore considered practicable and is preferably carried to the point where the surface area of the filament is weakened to obtain maximum orientation of the internal mass of the filament without breakage.

From the second godet 17 the filament is drawn by a third godet 19 having three driven rollers 20 about which the filament is carried through a second heating oven 21 and a second quench or cooling tank 22, the third godet 19 being driven at a speed substantially less than the speed of the second godet 17 to compensate for lineal shrinkage. The second heating oven is maintained at a temperature, calculated in relation to length of the oven, the lineal speed and cross-sectional area of the filament and the formulation of the particular material, suitable for melting the surface area of the filament, the depth of the melted surface area being predetermined as desired by the relationship of these factors. In practice, this temperature in the range of sizes, shapes and types above referred to is of the order of 900° F. to 1400° F. The melted surface area is solidified by the quench or cooling tank 22 into a homogeneous non-fibrous casing which through remelting and solidification while being drawn between the second godet 17 and the third godet 19 connects the oriented and weakened surface fibres into a smooth homogeneous non-fibrous, non-oriented and split-resistant casing integrally fused with the fibrous highly oriented body or core. The relatively high heat of the second heating oven 21 followed by cooling in the quench or cooling tank 22 also straightens out the curvature that is imparted to the cooled filament as a result of passing around the rollers of the second godet 17.

The relative speeds of the rollers of the second and third godets is such that the filament is drawn without stretching tension, while at the same time permitting the lineal shrinkage of the filament which takes place as a result of the heat induced relaxing of internal stresses. The heating of the filament at the surface melting high temperatures employed herein also causes a limited degree of relaxation of the linearly oriented fibres of the internal core with the result that the surface speed of the filament over the rollers of the third godet is somewhat less than the surface speed over the second godet, being at sufficient variance to compensate for the relaxation shrinkage of the filament without filament-roller slippage.

The relaxation of the linearly oriented fibrous core at the surface melting high temperature employed herein, in combination with the simultaneously produced homogeneous remelt surface, gives to the finished filament a degree of snap-back substantially higher than has obtained with previous relaxation methods.

From the third godet 19 the finished filament is drawn by a pair of feed rollers 23 to the sheer plates 24 of a cut-off unit 25 which is synchronized with the speed movement of the filament to cut off desired lengths of the filament suitable for its end use. It will be understood that if desired the filament may be drawn upon a suitable winding reel for subsequent cutting into suitable lengths.

In FIGS. 2 and 3 there is shown a filament F of circular cross-section according to the invention in which the core 26 is linearly oriented and is encased in a melt-produced homogeneous casing 27 fused thereto.

In FIG. 4 there is shown a filament Fa of oval cross-section comprising a fibrous oriented core 26a and a melt-produced homogeneous casing 27a. This cross-sectional shape is especially suitable for brush use where the bristles are secured at one end and flex in one direction, that is, in a plane parallel to the narrower dimension of the filament. In heavy duty rotary brushes of the type employed in street cleaning equipment, the dimensions of the filament are of the order of 0.70″–.110″.

In FIG. 5 there is shown a filament Fb of triangular cross-section comprising a linearly oriented core 26b and a melt-produced homogeneous casing 27b.

In FIGS. 6 and 7 there is shown a tubular filament Fc of circular cross-section comprising a linearly oriented core 26c and a melt-produced homogeneous casing 27c.

The following examples are illustrative of the practice of the invention. The extruded material in each example was polypropylene, the quenching medium in each quenching tank was continuous running cold water having a temperature of approximately 50°–60° F., the first heating oven was 6 feet long, and the second heating oven was 3 feet long. In each example the extruded material went through the following sequential steps, having reference to FIG. 1: It was drawn from the extruder 10 by the first godet 13 through the first quenching tank 12, it was drawn by the second godet 17 through the first heating oven 15 and the second quenching tank 16, it was drawn by the third godet 19 through the second heating oven 21 and the third quenching tank 22, and the finished filament was drawn from the third godet 19 by feed rollers 23.

*Example I*

A solid circular cross-section filament of .012″ size was drawn by the first godet at 50 f.p.m. (feet per minute) from the extruder, was drawn by the second godet at 500 f.p.m. through the first heating oven having a temperature of 650° F., and was drawn by the third godet at 450 f.p.m. through the second heating oven having a temperature of 1050° F.

*Example II*

A solid circular cross-section filament of .012″ size was drawn by the first godet at 60 f.p.m. from the extruder, was drawn by the second godet at 590 f.p.m. through the first heating oven having a temperature of 800° F., and was drawn by the third godet at 500 f.p.m. through the second heating oven having a temperature of 1200° F.

*Example III*

A solid oval cross-section filament of .028″ x .043″ size was drawn by the first godet at 56 f.p.m. from the extruder, was drawn by the second godet at 505 f.p.m. through the first heating oven having a temperature of 500° F., and was drawn by the third godet at 400 f.p.m. through the second heating oven having a temperature of 900° F.

*Example IV*

A solid oval cross-section filament of .028″ x .043″ size was drawn by the first godet at 100 f.p.m. from the extruder, was drawn by the second godet at 405 f.p.m. through the first heating oven having a temperature of 700° F., and was drawn by the third godet at 350 f.p.m. through the second heating oven having a temperature of 1100° F.

*Example V*

A solid oval cross-section filament of .070″ x .110″ size was drawn by the first godet at 47 f.p.m. from the extruder, was drawn by the second godet at 500 f.p.m. through the first heating oven having a temperature of 400° F., and was drawn by the third godet at 375 f.p.m. through the second heating oven having a temperature of 1400° F.

*Example VI*

A tubular circular cross-section filament of .040″ I.D. x .090″ O.D. was drawn by the first godet from the extruder at 47 f.p.m., was drawn by the second godet at 400 f.p.m. through the first heating oven having a temperature of 800° F., and was drawn by the third godet at 350 f.p.m. through the second heating oven having a temperature of 1400° F.

*Example VII*

A tubular circular cross-section filament of .040″ I.D. x .090″ O.D. was drawn by the first godet at 34 f.p.m. from the extruder, was drawn by the second godet at 375 f.p.m. through the first heating oven having a temperature of 1175° F., and was drawn by the third godet at 300 f.p.m. through the second heating oven having a temperature of 1200° F.

*Example VIII*

A tubular circular cross-section filament of .075″ I.D. x .120″ O.D. was drawn by the first godet at 30 f.p.m. from the extruder, was drawn by the second godet at 308 f.p.m. through the first heating oven having a temperature of 1075° F., and was drawn by the third godet at 250 f.p.m. through the second heating oven having a temperature of 1200° F.

The following observations are noted. Relatively small size filaments cool faster and run faster than heavier filaments and require higher heats for orientation and remelting. Heavy solid filaments require more cooling between the extruder and the orienting godets than the lighter filaments. Hollow or tubular filaments cool faster because they have no hot centers, and relatively higher heats are required for orientation.

What is claimed is:

1. A springy split- and wear-resistant smooth surfaced filament in the form of an extrusion of a melt of polypropylene comprising a fibrous linearly oriented core surrounded by a split- and wear-resistant smooth surfaced casing fused thereto in the form of a solidified homogeneous remelt of the filament of substantial depth inwardly from the surface.

2. The invention as defined in claim 1, wherein said filament is solid.

3. The invention as defined in claim 1, wherein said filament is tubular.

4. A springy split- and wear-resistant smooth surfaced street sweeper broom bristle filament in the form of an extrusion of a melt of polypropylene comprising a fibrous linearly oriented core surrounded by a split- and wear-resistant smooth surfaced casing fused thereto in the form of a solidified homogeneous remelt of the filament of substantial depth inwardly from the surface.

References Cited
UNITED STATES PATENTS

| | | | |
|---|---|---|---|
| 2,965,925 | 12/1960 | Dietzsch | 161—178 |
| 2,990,580 | 7/1961 | Foster | 264—346 |
| 3,016,577 | 1/1962 | Ruggert | 264—342 |
| 3,106,442 | 10/1963 | Compostella et al. | 264—290 |

ALEXANDER WYMAN, *Primary Examiner.*

JACOB STEINBERG, *Examiner.*

R. A. FLORES, *Assistant Examiner.*